April 3, 1928.
J. H. HAMMOND, JR
1,664,549
SYSTEM OF CONTROL BY COMPRESSIONAL WAVES
Original Filed June 7, 1917
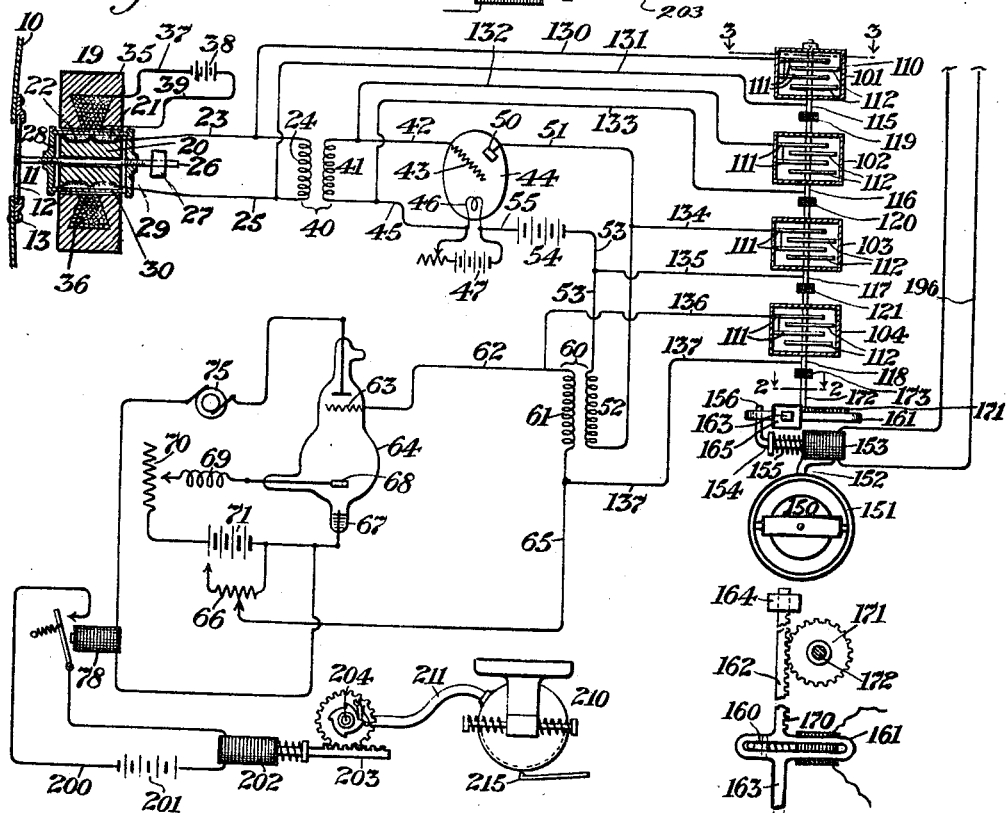
WITNESS:
Chas. F. Clagett
INVENTOR
John Hays Hammond Jr
A. S. Gardner
HIS ATTORNEY Patented Apr. 3, 1928.

1,664,549

UNITED STATES PATENT OFFICE.

JOHN HAYS HAMMOND, JR., OF GLOUCESTER, MASSACHUSETTS.

SYSTEM OF CONTROL BY COMPRESSIONAL WAVES.

Application filed June 7, 1917, Serial No. 173,332. Renewed October 28, 1925.

Some of the objects of this invention are to provide an improved system for the control of a movable body by compressional waves such, for instance, as sound waves or any other compressional waves; to provide in a system of control by compressional waves means for varying the responsiveness of the system; to provide in a system for controlling a movable body by compressional waves receiving means tuned to respond selectively to compressional waves of predetermined frequency in combination with means for automatically varying the tuning of the receiving means in response to a variation in the direction of movement of the movable body; to provide in a system for the teledynamic control of a movable body receiving means tuned to respond to a predetermined frequency in combination with means for automatically varying the tuning of the receiving means in response to a variation in the direction of movement of the movable body; to provide in a system for the teledynamic control of a movable body receiving means arranged to be initially tuned to respond to waves of a given frequency, in combination with means automatically operative to vary the tuning of the receiving means in response to a variation in the direction of movement of the movable body and in proportion to such variation in direction of movement, and in combination with means for controlling the rate of movement of the movable body, and means arranged to be actuated in response to the movement of the controlling means to vary the tuning of the receiving means in proportion to a variation in the rate of movement of the body; to provide in a system for the teledynamic control of a movable body receiving means arranged to be tuned in response to waves of a given frequency in combination with means for propelling the movable body and varying the rate of movement thereof and for automatically varying the tuning of the receiving means as a result of a variation in the rate of movement and the direction of the body and in proportion to such variation; and to provide other improvements as will appear hereinafter.

In the accompanying drawing, Fig. 1 is a fragmentary diagrammatic side elevation, partly in vertical section, of a movable body provided with a system of distant control constructed in accordance with this invention; Fig. 2 a top plan view of a portion of the same partly in horizontal section on line 2—2 of Fig. 1; Fig. 3 an enlarged horizontal section on line 3—3 of Fig. 1; and Fig. 4 shows diagrammatically the interconnections of the several parts.

Referring to the drawing, one embodiment of this invention comprises a movable body such, for instance, as a marine vessel or any other suitable body having a wall 10 carried thereby or forming a part thereof. The wall 10 is provided with a circular opening 11 which is closed by a flexible diaphragm 12 made of sheet metal or any other suitable material which is marginally clamped against the inner surface of the wall 10 by a circular plate 13 which is fixedly secured to the wall 10 in any suitable manner. The wall 10 may be an exterior wall of the hull of the vessel and the opening 11 may be so arranged that the diaphragm 12 will be beneath the surface of the water and arranged approximately in a vertical plane or in any other suitable plane when the vessel is in operation. The diaphragm 12 is thus arranged to be flexed and vibrated in response to compressional waves such, for instance, as sound waves or other suitable compressional waves transmitted through the water towards the vessel from any suitable source of energy.

Arranged within the vessel and in cooperative relation with the diaphragm 12 is an electric oscillator 19 comprising a stationary cylindrical core 20 which is made of wrought iron or soft steel and which is surrounded by two coils 21 and 22 of insulated conducting material, the two coils 21 and 22 being wound in opposite directions and being in series with a circuit including a conductor 23, an inductance 24 and a conductor 25. The core 20 is provided with an axial opening through which loosely extends a shaft 26, one end of which is rigidly secured to the central portion of the diaphragm 12 and the other end of which is arranged to reciprocate in a fixed bearing 27. Rigidly secured upon the shaft 26 are two discs 28 and 29 which are arranged upon opposite ends of the core 20 respectively, and clamped between and supported by these discs 28 and 29, and loosely surrounding and spaced slightly from the core 20, is a hollow cylindrical or tubular armature 30, made of copper or any other suitable conducting material.

Surrounding and spaced slightly from the tubular armature 30 is an annular electromagnet 35, made of cast iron or soft steel or any other suitable material, provided with an internal annular recess in which is wound a coil 36 of insulated wire, one end of which is connected by a conductor 37 to one pole of a battery 38, the other pole of which is connected by a conductor 39 to the other end of the coil 36. The construction of the oscillator 19 is such that when the diaphragm 12 is vibrated at a given frequency by compressional waves such as sound waves, or any other suitable waves, electric oscillations having the same frequency will be set up in the circuit including the conductors 23 and 25.

For selectively receiving the electrical oscillations produced by the oscillator 19, the inductance or coil 24 forms the primary of a transformer 40 which includes a secondary coil 41, one end of which is connected by a conductor 42 to the grid 43 of a gaseous detector 44. The other end of the coil 41 is connected by a conductor 45 to one end of the filament 46 of the detector 44. The filament 46 is energized by a battery 47. The upper terminal 50 of the detector 44 is connected by a conductor 51 to one end of a coil or inductance 52, the other end of which is connected by a conductor 53 with one pole of a battery 54 the other pole of which is connected by a conductor 55 to the filament 46 in a well known manner.

The coil 52 forms the primary of a transformer 60 which includes a secondary coil 61, one end of which is connected by a conductor 62 to the grid 63 of a mercury vapor detector 64 of any well known or suitable construction. The other end of the coil 61 is connected by a conductor 65 to a variable resistance 66 through which it is connected in a well known manner to the bottom terminal 67 of the detector 64. The detector 64 includes an annular terminal 68 which is connected through a choke coil 69 and variable resistance 70 to one pole of a battery 71, the other pole of which is connected to the bottom terminal 67. The detector 64 is arranged to control a circuit including a source of alternating electric current 75 and an electromagnet 78.

For automatically varying the tuning of the receiving system to compensate for variations in the frequency of the received signals caused by variations in the rate, or in the direction, or in both the rate and direction of movement of the vessel or other movable body, so as to keep the sound receiving system upon the movable body always in tune with the sound transmission system by which the movable body is controlled, this improved system is provided with four variable condensers 101, 102, 103 and 104, which are normally arranged in vertical alinement and which are held in fixed position with respect to the vessel.

Each of the condensers 101 to 104 includes a cylindrical casing 110 of glass, hard rubber, fibre or other insulating material or suitable material, within which are arranged a plurality of flat, normally horizontal stationary conducting plates 111 and a plurality of flat, normally horizontal movable conducting plates 112 suitably spaced from the stationary plates 111. The movable plates 112 of the four condensers 101 to 104 are mounted respectively upon four comparatively short, normally vertical rotary shafts 115, 116, 117 and 118 respectively, which are arranged in longitudinal alinement and which are supported for rotation about their longitudinal axes in the walls of their respective casings 110. These shafts are secured rigidly together and insulated from each other by means of insulating couplings 119, 120 and 121, and are out of contact with and thus insulated from the stationary plates 111.

The plates 111 and 112 may be of any suitable form as may be determined experimentally, but good results may be obtained by making these plates substantially semicircular in planular outline and arranging the plates coaxially with the shafts 115 to 118, as shown in Fig. 3, and so that the stationary plates 111 and the movable plates 112 will be arranged in two vertically alined series respectively.

The four variable condensers 101 to 104 are connected to and between the four pairs of conductors 23 and 25, 42 and 45, 51 and 53, and 62 and 65, respectively, by four pairs of conductors 130 and 131, 132 and 133, 134 and 135, and 136 and 137 respectively so as to form, in combination with the four coils or inductances, 24, 41, 52 and 61 respectively, four closed oscillatory circuits. The first two of these closed oscillatory circuits which include the coils 24 and 41 respectively are normally tuned by the corresponding condensers 101 and 102 to respond to a predetermined frequency, for instance to a predetermined wave frequency, and the other two of these closed oscillatory circuits which include the two coils 52 and 61 respectively are normally tuned by the corresponding condensers 103 and 104 to respond to a predetermined frequency, for instance to a predetermined wave group frequency lower than the predetermined wave frequency to which the first mentioned pair of closed oscillatory circuits are tuned.

For automatically and simultaneously changing the capacities of the condensers 101—104 in a degree proportional to the rate of change of the component of the boat's motion in the direction of the boat from the source of sound waves by which the boat is controlled, a gyroscope 150 is arranged beneath the condensers. This gyroscope 150 may be of any well known or suitable construction and in the form shown includes a gimbal ring 151 which is normally maintained in a vertical plane with its vertical axis spaced slightly away from the longitudinal axes of the shafts 115 to 118 and is normally held by the rotary elements of the gyroscope against rotation in space about that axis. Upon the upper surface of the ring 151 is rigidly secured a bracket 152 upon which is secured a normally horizontal solenoid 153 which controls a horizontally reciprocatory core 154 which is normally held in a predetermined position by a spiral spring 155. Rigidly secured to and projecting upwardly from the outer end of the core 154 is a rigid lug 156 which is normally spaced laterally a predetermined distance from the longitudinal axis of the shafts 115 to 118. The upper end of the lug 156 fits snugly but slidably in an elongated straight slot 160 which is provided therefor in an elongated horizontally extending rigid plate 161 which is supported to reciprocate transversely in a normally horizontal plane by means of two alined horizontal bars 162 and 163 rigid therewith and projecting in opposite directions therefrom and at right angles to the slot 160. These bars 162 and 163 are preferably rectangular in cross section and their outer portions fit snugly but slidably respectively in rectangular openings provided therefor in two stationary bearings 164 and 165. One of these bars, 162, is provided along one edge with vertical teeth forming a rack 170 which is arranged to engage and to actuate a pinion 171 which is rigidly secured to the lower end of a short vertical transmission shaft 172 which is beneath and in alinement with the lowermost condenser shaft 118, and the upper end of which is rigidly secured to and insulated from the lower end of the lowermost condenser shaft 118 by means of an insulating coupling 173. The construction is such that the longitudinal movement of the rack 170 with respect to the pinion 171 will be proportional to the cosine of the angle between the direction of movement of the boat and the direction of the boat from the controlling source of sound. The change in capacity of the condensers 101—104 will therefore be proportional to the speed of the boat times the cosine of said angle expressed in suitable units.

In this improved system the vessel or other movable body is arranged to be propelled by an internal combustion engine 180 or by any other suitable motor which rotates a propeller 181 for actuating the vessel, and the rate of rotation of which is controlled by a throttle valve 182 of any well known or suitable construction which may be actuated in any well known or suitable manner, as, for instance, by a throttle lever 183 which is pivoted as at 184 and which may be arranged to be oscillated from a distance, as will appear hereinafter. The vessel or other movable body is also provided with a rudder 185 which is rigidly secured to a substantially vertical rudder shaft 186 which is arranged in a well known manner to be rotated about its longitudinal axis. A lever 187 is rigidly secured to the rudder shaft, and pivotally secured respectively to the opposite ends of the lever 187 are two connecting rods 188 and 189 whereby the rudder 185 may be controlled as will appear hereinafter.

For automatically and simultaneously varying the capacities of the condensers 101—104, and consequently the tuning of the controlled circuits to compensate for a variation in the rate of movement of the vessel from a predetermined high speed to a predetermined low speed or the reverse, the lever 183 is insulated from the parts to which it is connected and is arranged to swing from a predetermined position such as is shown in full lines in Fig. 4 in which the engine will be caused to revolve at a predetermined high speed, into a position, such for instance as is shown in dotted lines in Fig. 4, in which the engine will be caused to revolve at a predetermined low speed, and in which the lever 183 will engage against a fixed contact 195 to close a circuit 196 extending through a battery 197 and the solenoid 153. The closing of the circuit 196 will cause the solenoid 153 to be energized and draw the core 154 inwardly against the action of the spring 155 and into a predetermined position to shorten the distance between the vertical axis of the stud 156 and the vertical axis of the gimbal ring 151 and thus decrease, in a predetermined degree, the amount of rotation, with respect to the vessel, of the shaft 172 and movable condenser plates 112 carried thereby for any given angular amount of deviation or rotation of the vessel from a given course.

For selectively controlling, in response to compressional waves transmitted from a distant station, the direction of movement and the rate of movement of the vessel or other movable body upon which this improved system may be mounted, the electromagnet 78 may be arranged to control a normally open electric circuit 200 including a battery 201 or other source of electric energy and a solenoid 202 acting upon a reciprocatory rack 203 to rotate a valve stem 204 or other element step by step in a given direction in response to successive energizations of the solenoid 202.

The valve stem 204 may be arranged as shown and described in my co-pending prior application Serial No. 67,947, Patent No.

1,418,793 issued June 6, 1922, to rotate a pneumatic valve (corresponding to the main controlling valve 425 of the said prior patent) arranged as disclosed in said prior application to control the direction of movement of the vessel or other movable body by controlling the movements of the rudder 185, and also arranged as disclosed in said prior patent to control the rate of speed of the vessel or other movable body by controlling the movements of the lever 183 so as to open or partially close the throttle valve 182. In this arrangement the valve stem 182, rudder post 186, lever 183, connecting rods 188 and 189 and throttle lever 183 of the present application corresponds to the valve stem 465, rudder post 65, lever 66, 67, connecting rods 130 and 145, and throttle lever 378 of the said prior patent (see Fig. 1 of the prior patent).

For automatically causing the vessel or other movable body to proceed normally upon a predetermined straight course, the vessel or movable body may be provided with an electric commutator 210 controlled by a separate gyroscope (not shown) or other direction maintaining means arranged, as described in my said prior Patent No. 1,418,793, issued June 6, 1922, to be controlled pneumatically by the rotation of the valve stem 204 operating to open or close a pipe 211 for rendering the gyroscope either operative or inoperative to control the commutator 210 and consequently the direction of movement of the vessel or other movable body, the commutator 210 being arranged to cooperate with a brush 215 and other brushes and parts including helm limiting parts, as described in the said prior patent this commutator 210, pipe 211 and brush 215 corresponding to the commutator 195, pipe 193 and brush 210 respectively of my said prior patent.

In the operation of this improved system, the parts are normally so adjusted that the vessel or other movable body will be controlled by the gyroscopically actuated commutator 210 and caused to proceed in a predetermined direction at a predetermined rate. When it is desired to divert the vessel from its course, an impulse of submarine or other compressional waves having the required wave frequency and wave group frequency is transmitted from the distant control station and acts upon the diaphragm 12 to vibrate it accordingly. This vibration of the diaphragm causes, in a well known manner, corresponding groups of electric oscillations to be set up in the closed oscillatory circuit including the primary coil 24 and variable condenser 101, and which is tuned to the wave frequency of the oscillations. The groups of oscillations in the primary coil 24 act inductively upon the secondary coil 41 and set up corresponding groups of oscillations in the controlled closed circuit including the secondary coil 41 and the variable condenser 102, and which is also tuned to the wave frequency of the oscillations in the controlling circuits 24 and 101. These groups of oscillations in the controlled circuit 41, 102, act to operate the detector 44 and to cause corresponding oscillations to be set up in the closed oscillatory circuit controlled by the detector 44 and including the primary coil 52 and the variable condenser 103, this latter circuit 52, 103 being tuned to the group frequency of the oscillations received by the detector 44. The oscillations in the primary coil 52 act inductively upon the secondary coil 61 and set up oscillations corresponding in frequency to the group frequency in the closed circuit including the secondary coil 61 and variable condenser 104, the latter circuit being tuned to the predetermined group frequency. The oscillations in the latter circuit cause an operation of the mercury detector 64 and a consequent unidirectional current to flow through the detector 64 and electromagnet 78 from the source of alternating current 75. The energization of the electromagnet 78 causes a closing of the normally open circuit through the solenoid 202 and a consequent rotation of the valve stem 204 through one step. The valve stem is thus rotated through one or more steps as may be necessary to render the gyroscopically controlled commutator 210 inoperative and to cause the vessel to turn either to the left or to the right as may be desired, or to control the speed of the vessel, or to render the gyroscopically controlled commutator 210 operative to cause the vessel to proceed upon any desired course under the automatic control of the gyroscopically controlled commutator as fully described in my United States Patent No. 1,418,793, granted June 6, 1922.

The parts of this improved system are so proportioned and arranged that during these various changes in the direction of movement and rate of movement of the vessel, the tuning of the two pairs of tuned receiving circuits including the two transformers 40 and 60 is automatically controlled by the gyroscope 150 and by the solenoid 153 to render these circuits always responsive to groups of compressional waves sent from a given distant station at a given and constant wave frequency and a given and constant group frequency, this wave frequency and group frequency being apparently or relatively varied as the groups of waves are received by the diaphragm 12 of the receiving system depending upon and in a manner proportioned to the variations in the direction of movement and in the rate of movement of the vessel.

Although only one of the systems in which this invention may be embodied has been described herein, it is to be understood that the invention is not limited in its application to any specific system but might be embodied in various forms without departing from this invention or the scope of the appended claims.

Having fully described this invention, I claim and desire to protect by Letters Patent of the United States:

1. A system for the distant control of a movable body, comprising receiving means tuned to respond selectively to radiant oscillations, in combination with means automatically operative to vary the tuning of said receiving means in response to a variation in the direction of movement of said movable body.

2. A system for the distant control of a movable body, comprising receiving means tuned to respond selectively to radiant oscillations, in combination with means automatically operative to vary the tuning of said receiving means in response to and in accordance with a variation in the direction of movement of said movable body.

3. A system for the distant control of a movable body, comprising receiving means tuned to respond selectively to compressional waves in combination with means automatically operative to vary the tuning of said receiving means, in response to variations in the direction of movement of said movable body.

4. A system for the distant control of a movable body, comprising receiving means tuned to respond selectively to compressional waves in combination with means automatically operative to vary the tuning of said receiving means in response to and in proportion to variations in the direction of movement of said movable body.

5. In a system for the distant control of a movable body, the combination with a movable body of receiving means carried thereby and arranged to be tuned to respond selectively to waves of radiant energy, and including means automatically operative to vary the tuning of said receiving means in response to variations in the direction of movement of said movable body.

6. In a system for the distant control of a movable body, the combination with a movable body of receiving means carried thereby and arranged to be tuned to respond selectively to waves of radiant energy, and including means automatically operative to vary the tuning of said receiving means in response to and in proportion to variations in the direction of movement of said movable body.

7. In a system for the distant control of a movable body, the combination with a movable body of receiving means carried thereby and arranged to be tuned to respond selectively to compressional waves having a given frequency, and comprising means automatically operative to vary the tuning of said receiving means in response to variations in the direction of movement of said body.

8. In a system for the distant control of a movable body, the combination with a movable body of receiving means carried thereby and arranged to be tuned to respond selectively to compressional waves having a given frequency, and comprising means automatically operative to vary the tuning of said receiving means in response to and in proportion to variations in the direction of movement of said body.

9. A system for the distant control of a movable vessel, comprising receiving means tuned to respond selectively to submarine compressional waves having a predetermined frequency, and comprising means automatically operative to vary the tuning of said receiving means in response to variations in the direction of movement of said movable body.

10. A system for the distant control of a movable vessel, comprising receiving means tuned to respond selectively to submarine compressional waves having a predetermined frequency, and comprising means automatically operative to vary the tuning of said receiving means in response to and in proportion to variations in the direction of movement of said movable body.

11. The combination with a movable vessel of receiving means carried thereby and arranged to respond selectively to submarine compressional waves having a predetermined frequency, and comprising means automatically operative to vary the tuning of said receiving means in response to variations in the direction of movement of said vessel.

12. In a system of distant control, the combination with a movable body of means carried thereby for propelling said body, and receiving means carried by said body and arranged to be tuned to respond selectively to radiant oscillations having a predetermined frequency, including means automatically operative to vary the tuning of said receiving means in response to a combined variation in the rate and direction of movement of said body.

13. In a system of distant control, the combination with a movable body of means carried thereby for propelling said body, and receiving means carried by said body and arranged to be tuned to respond selectively to radiant oscillations having a predetermined frequency, including means automatically operative to vary the tuning of said receiving means in response to and in proportion to a combined variation in the rate and direction of movement of said body.

14. The combination with a movable body of means carried thereby for propelling said body at a predetermined rate, and receiving means carried by said body and responsive to radiant oscillations having a predetermined frequency, and comprising means automatically operative to vary the tuning of said receiving means in response to a combined variation in the rate and direction of movement of said body.

15. The combination with a movable body of means carried thereby for propelling said body at a predetermined rate, and receiving means carried by said body and responsive to radiant oscillations having a predetermined frequency, and comprising means automatically operative to vary the tuning of said receiving means in response to and in proportion to a combined variation in the rate and direction of movement of said body.

16. The combination with a movable body, of receiving means carried thereby and arranged to control the direction of movement of said body in response to radiant oscillations, said receiving means being arranged to be tuned to respond to radiant oscillations having a predetermined frequency, and comprising means automatically operative to vary the tuning of said receiving means in response to and in accordance with variations in the direction of movement of said body.

17. The combination with a movable body of receiving means carried by said body and responsive to radiant oscillations for controlling the direction of movement of said body, said receiving means including a plurality of cooperating tuned devices and means automatically operative to simultaneously vary the tuning of said devices in accordance with variations in the direction of movement of said body.

18. The combination with a movable body of receiving means carried by said body and responsive to radiant oscillations for controlling the direction of movement of said body, said receiving means including a plurality of cooperating tuned circuits and means automatically operative to simultaneously vary the tuning of said circuits in accordance with variations in the direction of movement of said body.

19. The combination with a movable body, of receiving means carried by said body, and including a plurality of cooperating circuits arranged to be tuned to respond to radiant oscillations having a predetermined frequency, and means automatically operative to simultaneously vary the electrical capacities of said circuits in accordance with variations in the direction of movement of said body.

20. The combination with a movable body of receiving means carried by said body and arranged to be turned to respond selectively to radiant oscillations having a given frequency, and including means automatically operative to vary the tuning of said receiving means in accordance with variations in the movement of said body.

21. The combination with a movable body of receiving means carried thereby, and including a plurality of cooperating electric circuits arranged to be tuned to respond to radiant oscillations having a given frequency, and means automatically operative to vary the capacities of said circuits in accordance with variations in the movement of said body.

22. The combination with a movable body of receiving means carried thereby, and including a plurality of cooperating electric circuits arranged to be tuned to respond to radiant oscillations having a given frequency, and means automatically operative to simultaneously vary the capacities of said circuits in accordance with variations in the movement of said body.

23. The combination with a movable body of receiving means carried thereby, and including a plurality of cooperating electric circuits arranged to be tuned to respond to radiant oscillations having a given frequency, and means automatically operative to vary the capacities of said circuits in accordance with variations in the direction of movement of said body.

24. The combination with a movable body of receiving means carried thereby, and including a plurality of cooperating electric circuits arranged to be tuned to respond to radiant oscillations having a given frequency, and means automatically operative to simultaneously vary the capacities of said circuits in accordance with variations in the direction of movement of said body.

25. The combination with a movable body, of receiving means carried by said body, and including a plurality of cooperating electrical circuits arranged to be tuned to respond to radiant oscillations having a predetermined frequency, means automatically operative to vary the capacities of said circuits in accordance with variations in the direction of movement of said body, and means automatically operative to vary the capacities of said circuits in accordance with variations in the rate of movement of said body during said variation in direction.

26. The combination with a movable body, of receiving means carried by said body, and including a plurality of cooperating electrical circuits arranged to be tuned to respond to radiant oscillations having a predetermined frequency, means automatically operative to simultaneously vary the capacities of said circuits in accordance with variations in the direction of movement of said body, and means automatically operative to vary the capacities of said circuits in accordance with variations in the rate of movement of said body during said variation in direction.

27. The combination with a movable body, of receiving means carried thereby and arranged to be tuned to respond to radiant oscillations having a given frequency, and comprising means including direction maintaining means automatically operative for varying the tuning of said receiving means in accordance with variations in the movement of said body.

28. The combination with a movable body, of receiving means carried thereby and arranged to be tuned to respond to radiant oscillations having a given frequency, and comprising means including a gyroscope automatically operative for varying the tuning of said receiving means in accordance with variations in the movement of said body.

29. The combination with a movable body of means carried thereby for propelling said body, and receiving means carried by said body and arranged to be tuned to respond to radiant oscillations having a given frequency and comprising means including a gyroscope automatically operative to vary the tuning of said receiving means in accordance with variations in the direction of movement of said body, and means automatically operative to vary the tuning of said receiving means in accordance with variations in the operation of said propelling means.

30. The combination with a movable body of receiving means carried thereby and arranged to control the direction of movement of said body in response to radiant oscillations, said receiving means including a plurality of cooperating circuits arranged to be tuned to respond respectively to different predetermined frequencies, and means automatically operative to vary the tuning of said circuits in accordance with variations in the movement of said body.

31. The combination with a movable body of receiving means carried thereby and arranged to control the direction of movement of said body in response to radiant oscillations, said receiving means including a plurality of cooperating circuits arranged to be tuned to respond respectively and successively to different predetermined frequencies, and means automatically operative to vary the tuning of said circuits in accordance with variations in the movement of said body.

32. The combination with a movable body of receiving means carried thereby and arranged to control the direction of movement of said body in response to radiant oscillations, said receiving means including a plurality of cooperating circuits arranged to be tuned to respond respectively to different predetermined frequencies, and means automatically operative to vary the tuning of said circuits in accordance with variations in the direction of movement of said body.

33. The combination with a movable body of receiving means carried thereby and arranged to control the direction of movement of said body in respect to radiant oscillations, said receiving means including a plurality of cooperating circuits arranged to be tuned to respond respectively and successively to different predetermined frequencies, and means automatically operative to vary the tuning of said circuits in accordance with variations in the direction of movement of said body.

34. In a system for the control of a body movable in a natural medium, a receiving device tuned to respond selectively to compressional waves transmitted through the natural medium, in combination with means automatically operative to vary the tuning of said receiving device in response to a variation in the direction of movement of the body with respect to the natural medium.

35. A system for the control of a body movable through a natural medium comprising receiving means tuned to respond selective to compressional waves transmitted through the medium, said receiving means including a device in contact with the medium surrounding the body, in combination with means automatically operative to vary the tuning of said receiving means in response to and in accordance with a variation in the direction in which the compressional waves impinge upon said device.

36. In a receiving system for radiant energy, the combination with a device positioned to intercept the received energy, a utility controlled by the received energy, an amplifier interposed between the energy responsive device and the controlled utility, resonating electrical circuits interposed between the energy responsive device and the amplifier and between the amplifier and the utility and means including a gyroscope for simultaneously varying the electrical periods of said resonating circuits.

37. The combination with several adjustable oscillation circuits, and a tuning device connecting the several circuits and having an adjustable tuning element arranged to vary the electrical period of each of said circuits, of a gyroscope for controlling the action of said tuning device.

38. The combination with several adjustable oscillation circuits, and a tuning device connecting the several circuits and having an adjustable tuning element arranged to vary the electrical period of each of said circuits, of a gyroscope arranged to modify the action of said tuning device.

39. The combination with several interdependent resonant circuits, a tuning device for simultaneously adjusting said circuits to resonant at desired frequency, and a gyroscope for controlling the action of said tuning device.

40. The combination of several associated resonant circuits, each of said circuits having an adjustable tuning element, and gyroscopic means for controlling all of said tuning elements simultaneously.

41. The combination with a movable body, a plurality of resonant circuits positioned on said body, each having a tuning element movable with respect to said body, and a controller fixed in space operatively connected to said tuning elements.

Signed at New York, in the county of New York and State of New York, this 6th day of June, A. D. 1917.

JOHN HAYS HAMMOND, Jr.